(12) United States Patent
Yokoyama et al.

(10) Patent No.: US 11,750,131 B2
(45) Date of Patent: Sep. 5, 2023

(54) MOTOR DRIVE METHOD AND MOTOR DRIVE APPARATUS

(71) Applicant: DAIKIN INDUSTRIES, LTD., Osaka (JP)

(72) Inventors: Takahiro Yokoyama, Osaka (JP); Takayuki Miyajima, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/754,276

(22) PCT Filed: Sep. 29, 2020

(86) PCT No.: PCT/JP2020/036986
§ 371 (c)(1),
(2) Date: Mar. 29, 2022

(87) PCT Pub. No.: WO2021/065938
PCT Pub. Date: Apr. 8, 2021

(65) Prior Publication Data
US 2022/0416703 A1 Dec. 29, 2022

(30) Foreign Application Priority Data
Sep. 30, 2019 (JP) ................. 2019-180997

(51) Int. Cl.
*H02P 23/03* (2006.01)
*H02P 23/14* (2006.01)

(52) U.S. Cl.
CPC .............. *H02P 23/03* (2013.01); *H02P 23/14* (2013.01); *H02P 2207/05* (2013.01)

(58) Field of Classification Search
CPC ...... H02P 23/03; H02P 23/14; H02P 2207/05; H02P 29/032; H02P 6/18; H02P 21/04;
(Continued)

(56) References Cited

U.S. PATENT DOCUMENTS 6,313,597 B1  11/2001  Elliott et al.
9,077,265 B2 *  7/2015  Tsukamoto ............... H02P 6/18
(Continued)

FOREIGN PATENT DOCUMENTS

CN  102045021  5/2011
CN  202971420 U  6/2013
(Continued)

OTHER PUBLICATIONS

Extended European Search Report dated Oct. 31, 2022 with respect to the related European patent application No. 20871425.3.
(Continued)

*Primary Examiner* — David Luo
(74) *Attorney, Agent, or Firm* — IPUSA, PLLC

(57) ABSTRACT

A motor drive method is a method of driving a motor by a motor drive apparatus. The motor drive apparatus includes an inverter that regulates supplied power to the motor that is a position sensorless synchronous machine, and includes a controller that outputs a control signal to control the inverter. The method includes reducing output torque of the motor to be less than maximum output torque, in a speed range that is lower than a first speed at which the motor rotates. The maximum torque that is output from the motor is the maximum output torque in a case the motor drive apparatus drives the motor.

18 Claims, 7 Drawing Sheets

(58) Field of Classification Search
CPC .......... H02P 21/05; H02P 21/22; H02P 21/24; H02P 23/04; H02P 23/20
USPC .............................. 318/400.15, 400.01, 700
See application file for complete search history.

(56) References Cited

U.S. PATENT DOCUMENTS

| | | | |
|---|---|---|---|
| 9,590,541 B2* | 3/2017 | Pollock | H02P 25/08 |
| 9,998,052 B2* | 6/2018 | Shimada | H02P 21/18 |
| 10,879,821 B2* | 12/2020 | Lakshmi Narasimha | H02P 21/32 |
| 2008/0252242 A1 | 10/2008 | Akama et al. | |
| 2011/0084638 A1 | 4/2011 | Patel et al. | |
| 2016/0261218 A1 | 9/2016 | Tsukakoshi et al. | |
| 2017/0070171 A1 | 3/2017 | Tsukakoshi et al. | |
| 2018/0205339 A1 | 7/2018 | Xiang et al. | |
| 2020/0313582 A1 | 10/2020 | Hattori et al. | |

FOREIGN PATENT DOCUMENTS

| | | |
|---|---|---|
| JP | H04-281392 | 10/1992 |
| JP | 2003-111498 | 4/2003 |
| JP | 2008-080142 | 4/2008 |
| JP | 2010-011542 | 1/2010 |
| JP | 2010-154598 | 7/2010 |
| JP | 2011-091976 | 5/2011 |
| JP | 2015-080344 | 4/2015 |
| JP | 2017-034762 | 2/2017 |
| JP | 2017-184549 | 10/2017 |
| JP | 2018-003786 | 1/2018 |
| JP | 2018-014789 | 1/2018 |
| WO | 2015/137372 | 9/2015 |

OTHER PUBLICATIONS

International Preliminary Report on Patentability for PCT/JP2020/036986 dated Apr. 14, 2022.
International Search Report for PCT/JP2020/037018 dated Dec. 8, 2020.
International Search Report for PCT/JP2020/036986 dated Dec. 22, 2020.
Brochure of "Mitsubishi Electric Sensorless Servo General Catalog" published on Jun. 2019. With Partial Translation.
Geng Yang et al., "Sensorless Control of Position of Brush-Less DC Motor Based on an Adaptive Observer", T.IEE Japan, vol. 113-D, No. 5,1993. With Partial Translation.
Katsumi Inuzuka et al., "Steady-State Torque Control System with Secondary-Current Feedback for 3 Phase Squirrel-Cage Induction Motors", T.IEE Japan, vol. 114-D, No. 12, 1994. With Partial Translation.
Yukio Kawabata et al., "Study of New Start Method for Position Sensorless Brushless DC Motor", IEEJ Trans. IA, vol. 126, No. 11,2006. With Partial Translation.

* cited by examiner

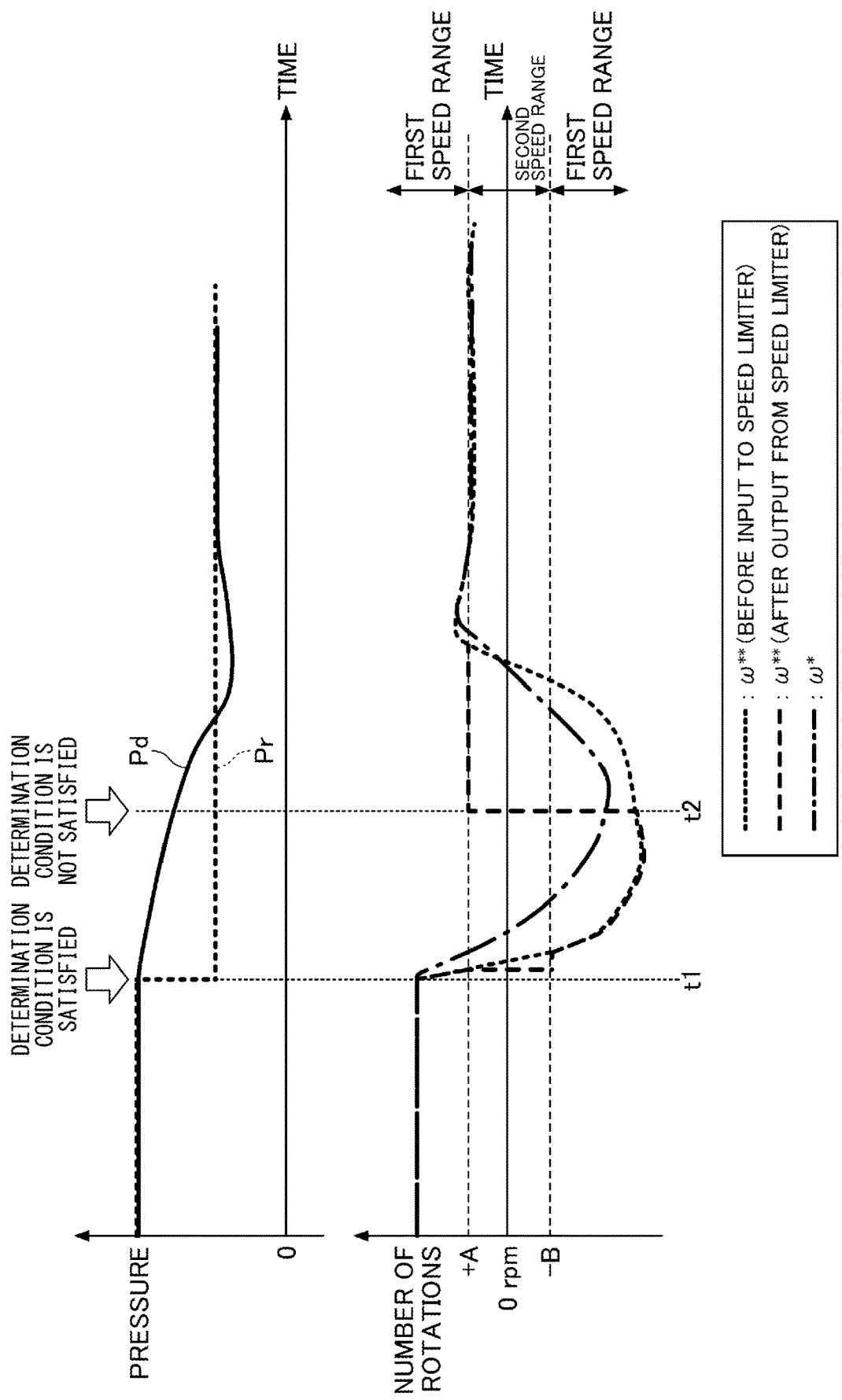

MOTOR DRIVE METHOD AND MOTOR DRIVE APPARATUS

TECHNICAL FIELD

The present disclosure relates to a motor drive method and a motor drive apparatus.

BACKGROUND ART

As a conventional motor control system, a motor is known to be controlled in a position sensorless control that does not use a position sensor for detecting a rotational position of the motor (see Patent Document 1).

RELATED-ART DOCUMENT

Patent Document

[Patent Document 1] Japanese Unexamined Patent Application Publication No. 2011-91976

SUMMARY

Problem to be Solved by the Invention

In the position sensorless control that does not use the position sensor for detecting the rotational position of the motor, the motor is difficult to operate stably in a low speed range.

The present disclosure proposes a motor drive method and a motor drive apparatus that can cause a motor to operate stably in the position sensorless control.

Means to Solve the Problem

A motor drive method of the present disclosure is a method of driving a motor by a motor drive apparatus that includes:
an inverter that regulates supplied power to a motor that is a position sensorless synchronous machine; and
a controller that outputs a control signal to control the inverter, the method including:
reducing output torque of the motor to be less than maximum output torque, in a speed range that is lower than a first speed at which the motor rotates, wherein
maximum torque that is output from the motor is the maximum output torque in a case where the motor drive apparatus drives the motor.

A motor drive apparatus of the present disclosure includes:
an inverter configured to regulate supplied power to a motor that is a position sensorless synchronous machine; and
a controller configured to output a control signal to control the inverter, wherein
when maximum torque that is output from the motor is maximum output torque in a case where the motor drive apparatus drives the motor,
the controller is configured to reduce the output torque of the motor to be less than the maximum output torque, in a speed range that is lower than a first speed at which the motor rotates.

Maximum output torque is determined based on a device constant for a motor, a control constant for a controller, a current magnitude of the motor, or the like. In general, the motor is difficult to stably operate at a substantially fixed speed under a condition in which the motor transmits maximum output torque, because errors in position estimation occurs due to factors such as over time, temperature characteristics, individual differences, and the like. Also, when the output torque of the motor is reduced, rotational stability of the motor is increased. According to the motor drive method or the motor drive apparatus of the present disclosure, in a speed range that is lower than a first speed at which the motor rotates, the output torque of the motor is reduced to be less than maximum output torque, without being maintained (fixed) at the maximum output torque. Therefore, rotational stability of the motor is increased, and the motor can thereby operate in a low speed range.

In a motor drive method or motor drive apparatus of the present disclosure, a frequency that does not depend on rotation of a motor and is among a harmonic component of a current through the motor or a voltage of the motor is substantially the same in each of a speed range that is lower than a first speed and a speed range that is higher than or equal to the first speed.

According to the motor drive method or motor drive apparatus of the present disclosure, the motor can operate more stably in a low speed range.

In a motor drive method or motor drive apparatus of the present disclosure, a torque coefficient for a motor is in a controlled state, in a speed range that is lower than a first speed.

According to the motor drive method or motor drive apparatus of the present disclosure, the motor can operate more stably in a low speed range.

In a motor drive method or motor drive apparatus of the present disclosure,
when a speed that is lower than a first speed is a second speed,
a motor does not operate steadily in a speed range that is lower than the second speed, and the speed range includes zero speed.

According to the motor drive method or motor drive apparatus of the present disclosure, the motor can operate more stably in a low speed range.

In a motor drive method of the present disclosure,
a motor drive apparatus includes a load detector that detects a load that is applied to a device or a motor, and the device operates in accordance with driving of a motor.

In a speed range that is lower than a first speed at which the motor rotates, and in a loading range in which the load detected by the load detector is greater than a predetermined magnitude,
as the rotation of the motor is reduced, output torque is reduced significantly, and
as the load detected by the load detector is increased, the output torque is reduced significantly.

A motor drive apparatus of the present disclosure includes
a load detector that detects a load that is applied to a device or a motor, the device operating in accordance with driving of a motor,
wherein, in a speed range that is lower than a first speed at which the motor rotates, and in a loading range in which the load detected by the load detector is greater than a predetermined magnitude,
a controller is configured to
reduce output torque significantly as the rotation of the motor is reduced, and
reduce the output torque significantly as the load detected by the load detector is increased, as the rotation of the motor is reduced.

As rotation of a motor is reduced, rotational stability of the motor is reduced. As a load is increased, the rotational stability of the motor is reduced. According to a motor drive method or motor drive apparatus of the present disclosure, in a speed range that is lower than a first speed at which the motor rotates, and in a loading range in which the load detected by the load detector is greater than a predetermined magnitude, as the rotation of the motor is reduced, an amount of reductions in output torque is increased. Also, as the load detected by the load detector is increased, an amount of reductions in the output torque is increased. Therefore, in the speed range that is lower than the first speed at which the motor rotates, and in the loading range in which the load detected by the load detector is greater than the predetermined magnitude, rotational stability of the motor is increased. Thus, the motor can operate stably in a low speed range.

In a motor drive method and motor drive apparatus of the present disclosure,
a motor is a motor that drives a pump, and
a load is discharge pressure of the pump or load torque of the motor.

According to the motor drive method or motor drive apparatus of the present disclosure, the motor that drives the pump can operate stably in a low speed range and thus the pump can operate in the low speed range.

In a motor drive method of the present disclosure,
output torque is suppressed by limiting acceleration of a motor.

In a motor drive apparatus of the present disclosure,
a controller suppresses output torque by limiting acceleration of a motor.

When acceleration of a motor is limited, output torque of the motor is suppressed, and thus rotational stability of the motor is increased. According to the motor drive method or motor drive apparatus of the present disclosure, the output torque is suppressed by limiting the acceleration of the motor. Therefore, rotation stability of the motor is increased, and the motor can thereby operate stably in a low speed range.

In a motor drive method of the present disclosure,
acceleration of a motor is limited by reducing an upper limit for acceleration of a motor.

In a motor drive of the present disclosure,
a controller limits acceleration of a motor by reducing an upper limit for acceleration of the motor.

When the upper limit for the acceleration of the motor is reduced, the acceleration of the motor is limited, and thus output torque of the motor is suppressed. Therefore, rotational stability of the motor is increased. According to the motor drive method or motor drive apparatus of the present disclosure, the acceleration of the motor is limited by reducing the upper limit for the acceleration of the motor. Thus, the output torque of the motor is suppressed. Therefore, rotational stability of the motor is increased, and the motor can thereby operate stably in a low speed range.

In a motor drive method of the present disclosure,
output torque is suppressed by limiting a jerk of a motor.

In a motor drive apparatus of the present disclosure,
a controller suppresses output torque by limiting a jerk of a motor.

When the jerk of the motor is limited, the output torque of the motor is suppressed, and thus rotational stability of the motor is increased. According to the motor drive method or motor drive apparatus of the present disclosure, the output torque is suppressed by limiting the jerk of the motor. Therefore, rotational stability of the motor is increased, and the motor can thereby operate stably in a low speed range.

In a motor drive method of the present disclosure,
a jerk of a motor is limited by reducing an upper limit for the jerk of the motor.

In a motor drive apparatus of the present disclosure,
a controller limits a jerk of a motor by reducing an upper limit for the jerk of the motor.

When the upper limit for the jerk of the motor is reduced, the jerk of the motor is limited, and thus output torque of the motor is suppressed. Therefore, rotational stability of the motor is increased. According to the motor drive method or motor drive apparatus of the present disclosure, the jerk of the motor is limited by reducing the upper limit for the jerk of the motor. Thus, the output torque of the motor is suppressed. Therefore, rotational stability of the motor is increased, and the motor can thereby operate stably in a low speed range.

In a motor drive method of the present disclosure,
output torque is suppressed by limiting a current through a motor.

In a motor drive apparatus of the present disclosure,
a controller suppresses output torque by limiting a current through a motor.

When the current through the motor is limited, output torque of the motor is suppressed, and thus rotational stability of the motor is increased. According to the motor drive method or motor drive apparatus of the present disclosure, the output torque is suppressed by limiting the current through the motor. Therefore, rotational stability of the motor is increased, and the motor can thereby operate stably in a low speed range.

In a motor drive method of the present disclosure,
output torque is suppressed by reducing an upper limit for a current through a motor.

In a motor drive apparatus of the present disclosure,
a controller suppresses output torque by reducing an upper limit for a current through a motor.

When the upper limit for the current through the motor is reduced, the output torque of the motor is suppressed, and thus rotational stability of the motor is increased. According to the motor drive method or motor drive apparatus of the present disclosure, the output torque is suppressed by reducing the upper limit for the current through the motor. Therefore, rotational stability of the motor is increased, and the motor can thereby operate stably in a low speed range.

BRIEF DESCRIPTION OF DRAWINGS

FIG. 7 is a diagram illustrating an example of control waveforms used in the motor drive apparatus that uses the control of the present disclosure according to the second embodiment.

MODE FOR CARRYING OUT THE INVENTION

Embodiments will be described below.

Figure 1:
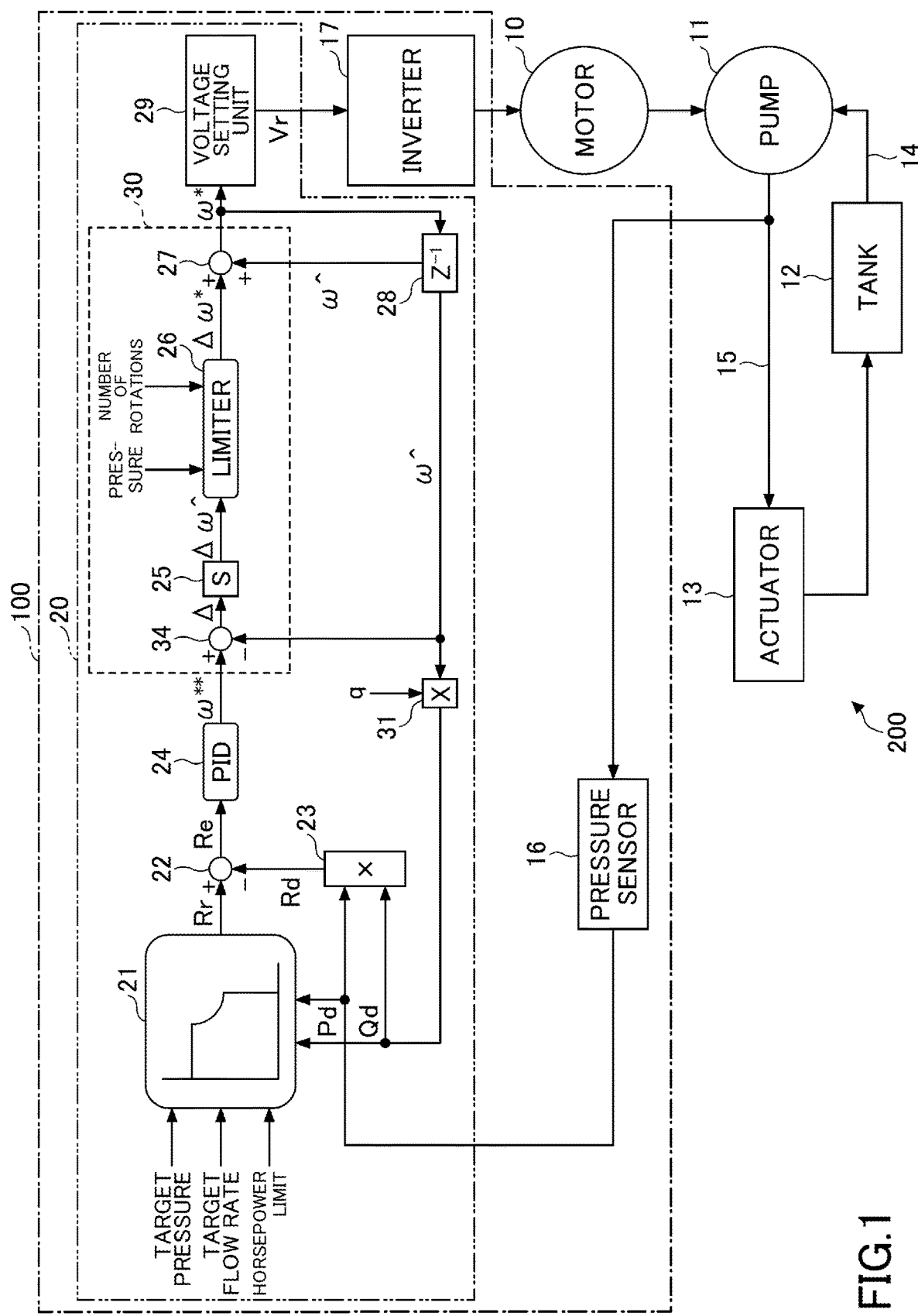
FIG. 1 is a diagram illustrating an example of the configuration of a fluid pressure unit that includes a motor drive apparatus according to a first embodiment.

FIG. 1 is a diagram illustrating an example of the configuration of a fluid pressure unit that includes a motor drive apparatus according to a first embodiment. A fluid pressure unit 200 illustrated in FIG. 1 drives a pump 11 by a motor 10 that is controlled by an inverter 17, to thereby supply fluid in a tank 12 to an actuator 13, such as a cylinder. When the fluid is oil, the fluid pressure unit is also referred to as a hydraulic unit. The fluid is not limited to liquid such as oil, and may be gas.

In the motor drive apparatus and motor drive method of the present disclosure, there is no limitation to a case in which the motor mounted on the fluid pressure unit is driven. A case in which the motor mounted on a device (for example, a compressor or the like that compresses gas by a motor), other than the fluid pressure unit, is driven can be also applied to the motor drive apparatus and motor drive method.

The fluid pressure unit 200 illustrated in FIG. 1 includes the pump 11, the tank 12, the actuator 13, the motor 10, and a motor drive apparatus 100.

The pump 11 is used to suck fluid from the tank 12 through an induction passage 14, compresses the fluid, and then discharges the compressed fluid to the actuator 13 through a discharge passage 15. The motor 10 is controlled with one or more inverters, by the motor drive apparatus 100 to thereby drive the pump 11.

The motor drive apparatus 100 drives the motor 10 without using a position sensor that detects the position (rotational position of the motor 10) of a rotor of the motor 10. The motor 10 is a position sensorless synchronous machine. The motor drive apparatus 100 includes a pressure sensor 16, an inverter 17, and a controller 20. A position sensorless motor-drive technology is known, and accordingly, description thereof is not provided.

The pressure sensor 16 detects pressure (discharge pressure) of the fluid that is discharged from the pump 11 and supplies the detected discharge pressure (hereinafter also referred to as pressure Pd) to the controller 20. The pressure sensor 16 is an example of a load detection unit that detects a load applied to a device (in this example, the pump 11) that operates in accordance with the driving of a motor. The discharge pressure is an example of a load that is applied to a device.

The motor drive apparatus 100 may include a torque sensor that detects load torque that is applied to the motor 10 and supplies the detected load torque to the controller 20. The torque sensor is an example of a load detector that detects a load that is applied to a motor.

The inverter 17 is a circuit that adjusts power supplied to the motor 10 and includes, for example, a three-phase bridge circuit.

The controller 20 outputs a control signal to control the inverter 17. The controller 20 causes the inverter 17 to operate to thereby control the motor 10, in order for the discharge pressure of the pump 11 to be set to target pressure, or in order for a rotational speed of the motor to be set to a speed corresponding to a target flow rate.

The controller 20 controls the operation of the inverter 17 that drives the motor 10, based on pressure Pd that is detected by the pressure sensor 16, a flow rate Qd that is calculated based on a command speed $\omega^*$, and a map (also referred to as a PQ map) 21 that shows "target pressure-target flow rate-power limit." The flow rate Qd that is calculated by the controller 20 expresses an estimate of a flow rate Q of the fluid that is discharged from the pump 11 to the discharge passage 15.

The controller 20 calculates a previous speed $\hat{\omega}$ that is used before a unit time (e.g., a control period), by a delay element 28 that delays a command speed $\omega^*$. The delay element 28 is a delay device that delays the command speed $\omega^*$ by a unit time. The controller 20 calculates a flow rate Qd [$m^3/s$] by a multiplier 31 that multiplies the previous speed $\hat{\omega}$ [1/s] by volume q [$m^3$] of the pump 11. The volume q of the pump 11 is fixed and is a fixed value. The controller 20 derives target horsepower Rr from the PQ map 21, by using target pressure Pr, which is supplied from the outside, and the flow rate Qd that is calculated by the multiplier 31. In contrast, the controller 20 determines detected horsepower Rd (=Pd×Qd), by the multiplier 23 that multiplies the pressure Pd, which is detected by the pressure sensor 16, by the flow Qd calculated by the multiplier 31. The controller 20 determines a difference Re (=Rr−Rd) between the target horsepower Rr and the detected horsepower Rd, by using a subtractor 22. The controller 20 includes a PID controller 24 that determines an original command speed $\omega^{}$ that causes the difference Re to approach zero by PID control (in PID, P denotes proportional, I denotes integral, and D denotes derivation). The original command speed $\omega^{}$ may be determined by PI control. The original command speed $\omega^{**}$ is an example of an original command speed that causes discharge pressure of the pump 11 to approach target pressure Pr.

The controller 20 includes a speed-command correcting unit 30. The speed-command correcting unit 30 calculates a speed difference $\Delta$ (=$\omega^{}-\hat{\omega}$) by the subtractor 34 that subtracts the previous speed $\hat{\omega}$ from the original command speed $\omega^{}$, and then calculates acceleration $\Delta\hat{\omega}$ by a differentiator 25 that differentiates the speed difference $\Delta$. The speed-command correcting unit 30 determines the acceleration $\Delta\hat{\omega}$ (acceleration $\Delta\hat{\omega}$ output from a limiter 26 is referred to as "acceleration $\Delta\omega^{**}$") that is limited by the limiter 26 and is set to less than or equal to an upper limit, and the upper limit is set in accordance with an actual loading condition (for example, a number of rotations (≈flow rate Q) and pressure P). The acceleration of $\Delta\hat{\omega}$ and $\Delta\omega^*$ expresses a change amount of speed per unit time (e.g., control period). The speed-command correcting unit 30 calculates the command speed $\omega^*$ of the motor 10, by an adder 27 that adds the acceleration $\Delta\omega^*$, indicating the change amount of speed per unit time, to the previous speed $\hat{\omega}$. The controller 20 includes a voltage setting unit 29 that sets a command voltage Vr that causes the inverter 17, which drives the motor 10, to operate based on the command speed $\omega^*$.

A function of each unit, such as the PID controller 24 provided in the controller 20, is implemented by a processor (for example, a CPU (central processing unit)) that operates in accordance with a program that is readably stored in a memory.

Figure 2:
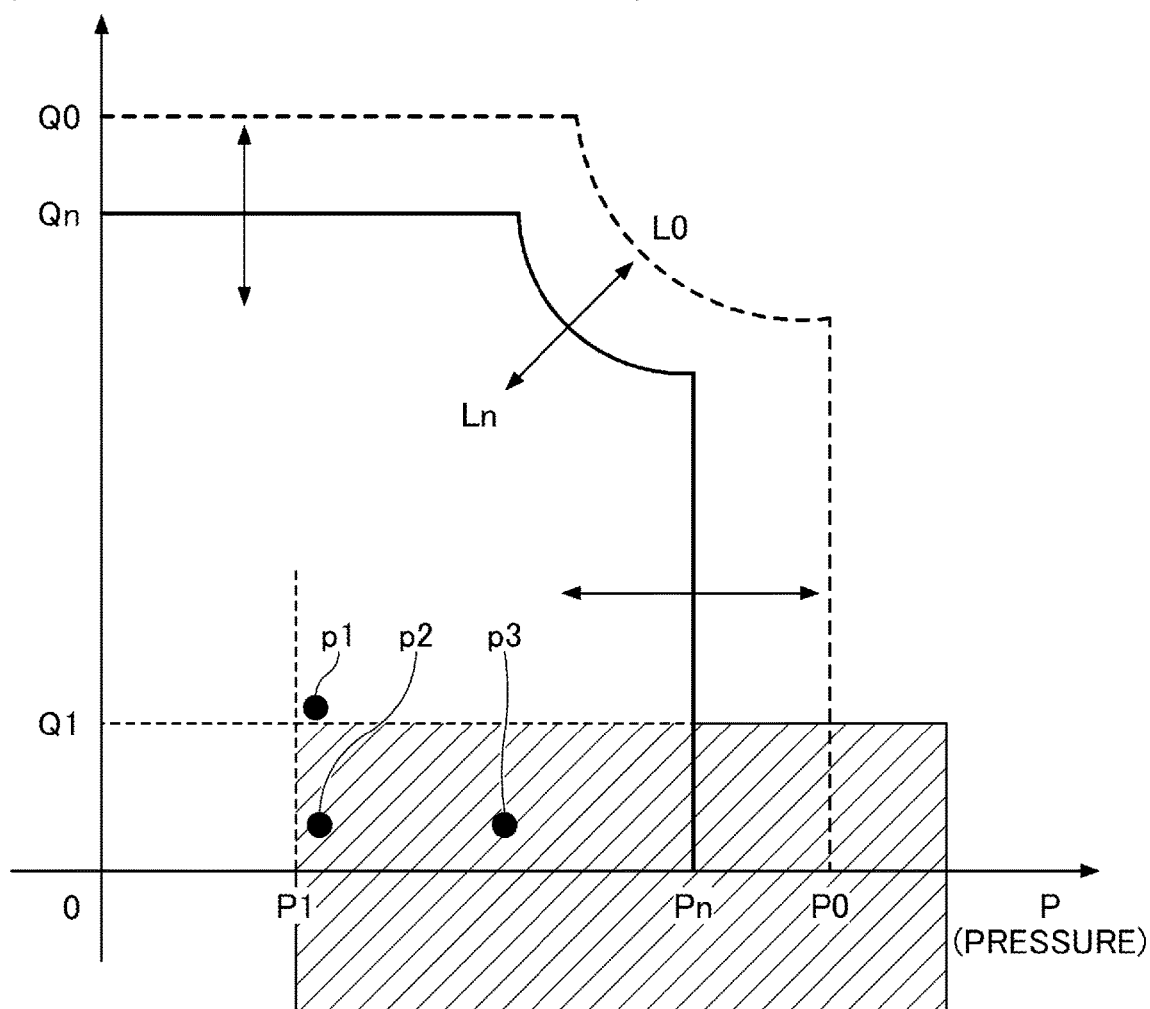
FIG. 2 is a diagram illustrating an example of a pressure-flow rate map.

FIG. 2 is a diagram illustrating an example of a pressure-flow map. The PQ map 21 includes a maximum flow line corresponding to a maximum set flow rate Q0; a maximum horsepower curve expressed by a curve corresponding to a maximum horsepower limit L0; and a maximum pressure line corresponding to maximum set pressure P0. Predetermined pressure P1 is pressure that is greater than zero and less than the maximum set pressure P0. A predetermined flow rate Q1 is a flow rate that is greater than zero and less than the maximum set flow rate Q0. The flow rate Q is obtained by a product of a rotation rate ω (number of rotations) of the motor 10 multiplied by the volume q of the pump 11. Thus, the flow rate Q is equivalent to the rotation rate ω.

The controller 20 causes the inverter 17, which drives the motor 10, to operate such that the pressure Pd, which is detected by the pressure sensor 16, and the flow rate Qd, which is calculated based on the command speed ω*, move on a line expressed by "set pressure Pn-set flow Qn-set horsepower curve Ln" in the PQ map 21. In particular, for an operating range (range expressed by diagonals in FIG. 2) in which the flow rate Qd is less than a predetermined flow rate Q1 and the pressure Pd is greater than the predetermined pressure P1, when the controller 20 causes the motor 10 to accelerate and decelerate, operational stability for the motor 10 is provided by reducing output torque of the motor 10.

With respect to operating points p1, p2, and p3 illustrated in FIG. 2, p1 is an operating point at which a given flow rate is slightly greater than the predetermined flow rate Q1, p2 is an operating point at which pressure is the same pressure as that obtained at p1 and a given flow rate is less than the predetermined flow rate Q1, and p3 is an operating point at which a flow rate is the same flow rate as that obtained at p2 but pressure is greater than that obtained at p2. The operating points p1, p2, and p3 illustrated in FIG. 2 correspond to respective operating points illustrated in FIG. 3, in consideration of a motor characteristic indicating the relationship between a number N of rotations and output torque T of the motor. For the motor characteristic illustrated in FIG. 3, maximum output torque Tm expresses maximum torque that can be output from the motor 10 when the motor drive apparatus 100 drives the motor 10. The output torque Ts expresses torque that is limited to the maximum output torque Tm, in order to perform a stable operation at a low speed and in a time of a high load. Torque obtained by subtracting each load torque Tb, which is transmitted to the motor 10, from output torque Ts, corresponds to acceleration torque Ta that can be used in acceleration and deceleration of the motor 10.

At the operating point p1, the flow rate is less than the predetermined flow rate Q1, and thus the output torque Ts is not limited to the maximum output torque Tm. When the operating point p1 is changed to the operating point p2, a corresponding flow rate becomes less than the predetermined flow rate Q1, and thus a torque limit amount Tc is increased by an amount decremented from the predetermined flow rate Q1. Thus, the output torque Ts becomes torque obtained by subtracting the torque limit amount Tc from the maximum output torque Tm. Between the operating points p1 and p2, pressure does not change, and thus there is no difference between magnitudes of the load torque Tb. Also, each acceleration torque Ta is reduced by the torque limit amount Tc. At this time, the current of a magnitude corresponding to at least the torque limit amount Tc can flow into the motor 10, and thus a reactive current is increased by a magnitude corresponding to the current magnitude, thereby enabling increased stability in the rotation control. When the operating point p2 is changed to the operating point p3, pressure (see FIG. 2) is increased, and the load torque Tb is thereby increased (see FIG. 3). Therefore, the acceleration torque Ta cannot be used due to the increase in the load torque Tb. At this time, the torque limit amount Tc increases as the load is reduced, and thus an available amount for the acceleration torque Ta is further reduced (see FIG. 3). Thus, as the motor 10 operates at a low speed, an available amount for the acceleration torque Ta is reduced. Alternatively, as the load (in this example, the load torque Tb or pressure P) that is applied to the motor 10 or pump 11 increases, the available amount for the acceleration torque Ta is reduced. Therefore, the output torque of the motor 10 is reduced.

In this description, when the rotation rate ω (number of rotations) of the motor 10 is N [1/s], the load torque of the motor 10 is Tb [Nm], the discharge pressure of the pump 11 is P [N/m²], the flow rate obtained discharged from the pump 11 is Q [m³/s], and the volume of the pump 11 is q [m³], the relationship between the pressure P of the pump 11 and the load torque Tb that is transmitted to the motor 10 is as follows:

$$2\pi \times N \times Tb = P \times Q = P \times N \times q \qquad \text{Equation 1}$$

When Equation 1 is modified, the following is obtained.

$$Tb = P \times q/(2\pi) \qquad \text{Equation 2}$$

Figure 3:
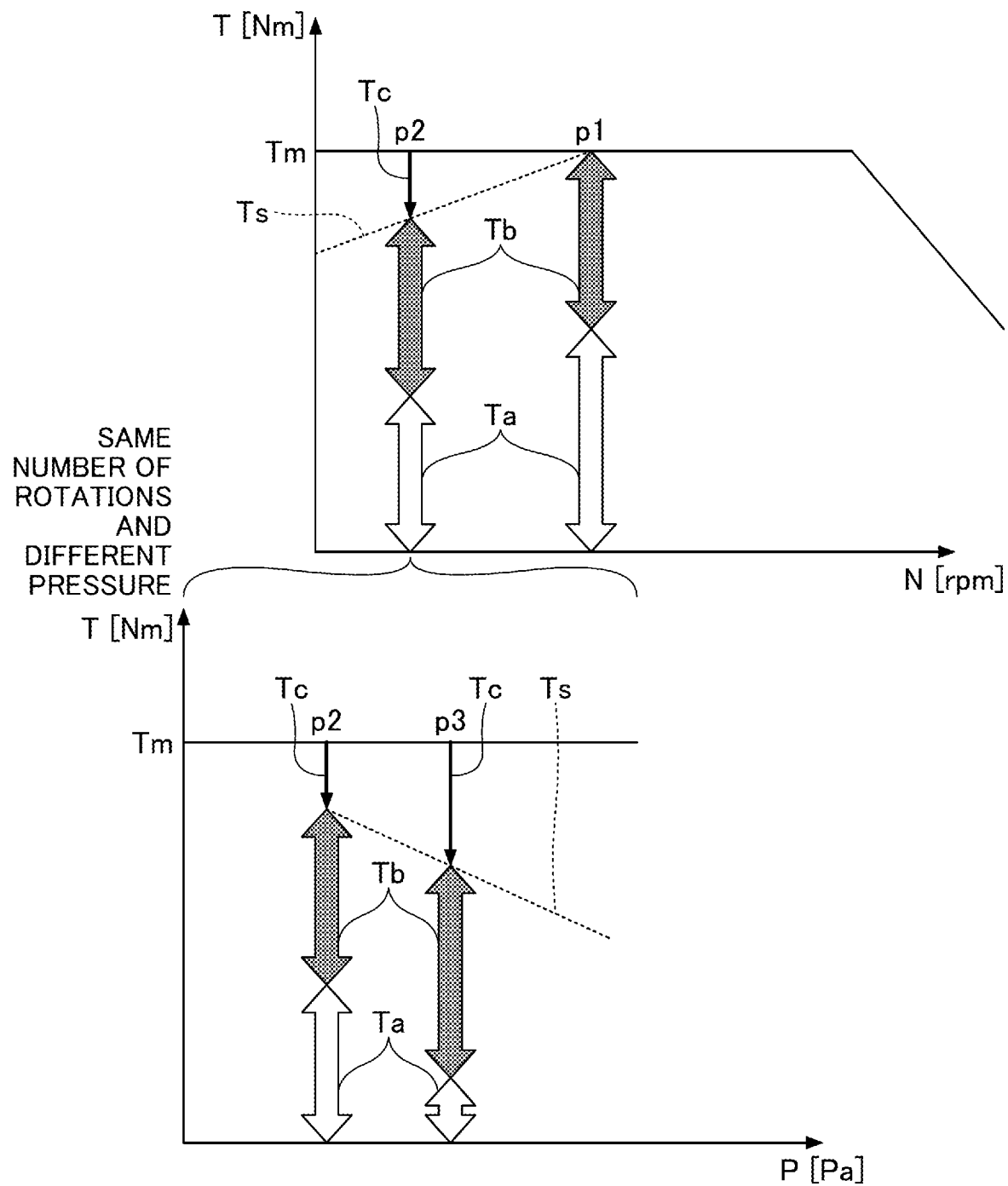
FIG. 3 is a diagram illustrating a motor characteristic indicating the relationship between a number of rotations and output torque of a motor.

The output torque Ts at a certain time point N, at which a number N of rotations is obtained, is a value obtained by subtracting a given torque limit amount Tc from the maximum output torque Tm, which is determined based on the motor characteristic illustrated in FIG. 3. The acceleration torque Ta that is available for acceleration and deceleration, at the certain time point N, can be determined as follows.

$$Ta = Ts - Tb \qquad \text{Equation 3}$$

In this case, the speed-command correcting unit 30 (see FIG. 1) can calculate a maximum value indicating available torque for acceleration and deceleration, by calculating the acceleration torque Ta based on Equation 2 and Equation 3. In the speed-command correcting unit 30, the limiter 26 limits the acceleration Δω^ with an upper limit that is set in accordance with the acceleration torque Ta, which is calculated based on Equations 2 and 3. With this arrangement, in a range expressed by diagonals illustrated in FIG. 2, the output torque of the motor 10 is controlled so as to be reduced without being maintained (fixed) at the maximum output torque Tm. Therefore, rotational stability of the motor 10 is increased.

Figure 4:
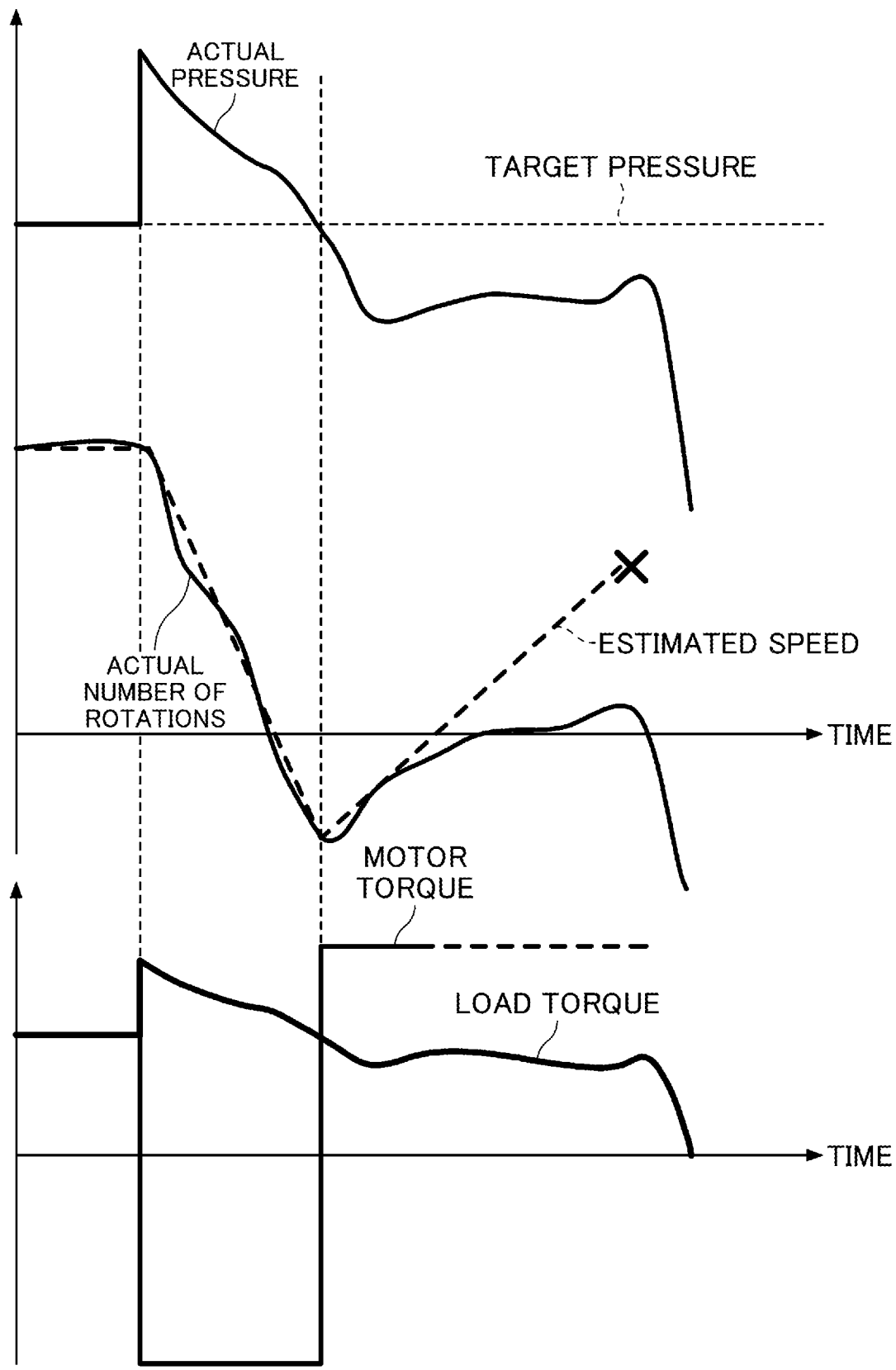
FIG. 4 is a diagram illustrating an example of control waveforms used in the motor drive apparatus in one comparative manner that does not use the control of the present disclosure.

FIG. 4 is a diagram illustrating an example of control waveforms used in a motor drive apparatus that does not use the control of the present disclosure in one comparative manner, and a case in which the function of the limiter 26 illustrated in FIG. 1 is not implemented is illustrated. When the actual pressure P is substantially the same as the target pressure, the motor 10 is in a state in which the motor rotates at a fixed speed at which acceleration and deceleration are not performed. A state in which the actual pressure P and the target pressure are substantially the same is a steady state (state in which the controller causes the motor to operate steadily). In this state, when a load disturbance that causes the actuator 13 to operate is input, the pressure P is increased, and thus the load torque Tb is increased. In accordance with increased pressure P, the controller of the motor drive apparatus performs a control in which the pressure P converges to the target pressure. In the control, the controller reduces the output torque such that the motor 10 rotates reversely, and thus causes the motor 10 to decelerate. When the pressure P undershoots the target pressure, the controller outputs torque that causes the motor 10 to accelerate, in order to increase the pressure P again. If the motor torque (output torque) increases rapidly, the motor 10 accelerates rapidly, and thus a control system becomes unstable. As a result, loss of synchronism may occur in the motor 10.

Figure 5:
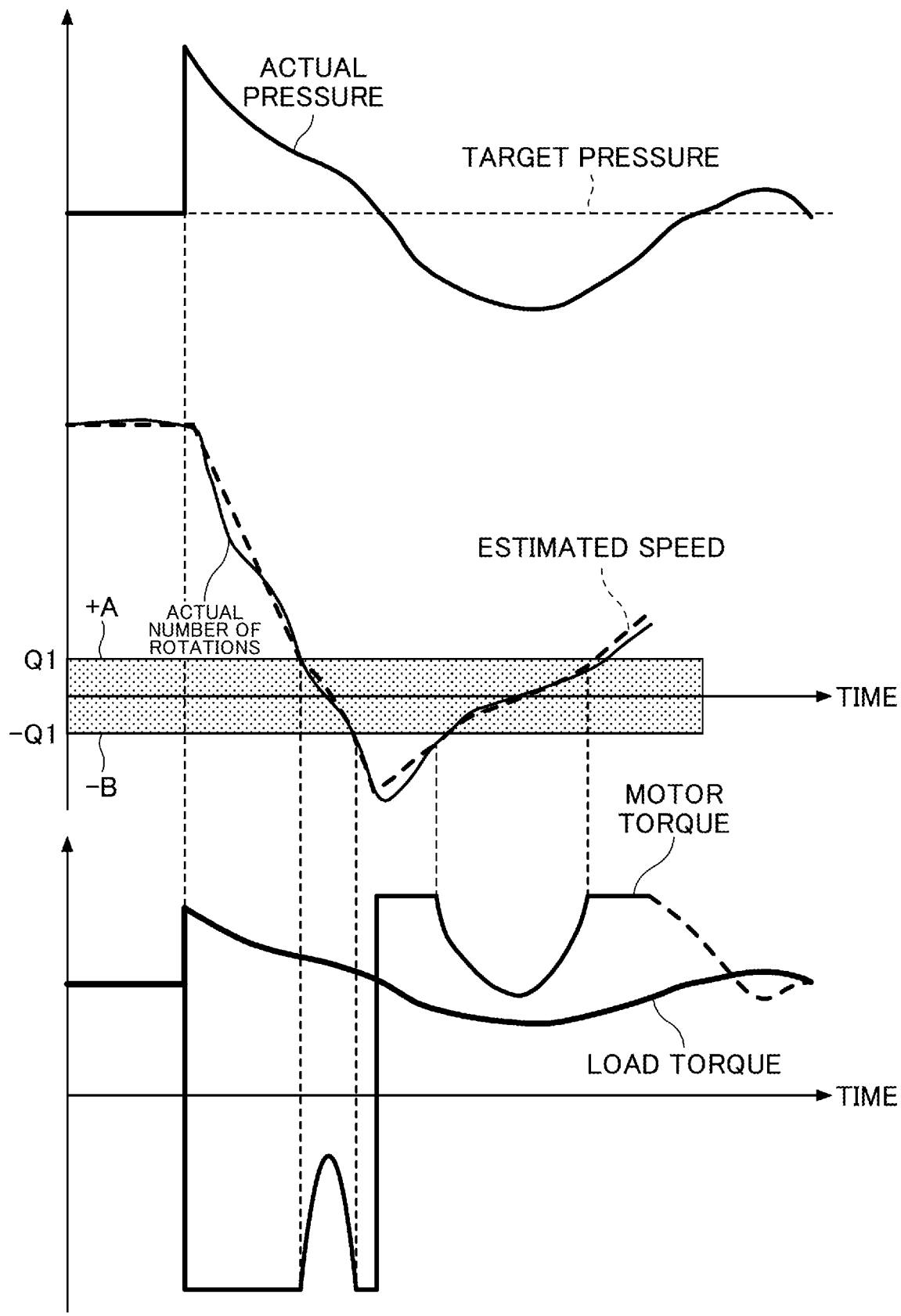
FIG. 5 is a diagram illustrating an example of control waveforms used in the motor drive apparatus that uses the control of the present disclosure according to the first embodiment.

FIG. 5 is a diagram illustrating an example of control waveforms used in the motor drive apparatus that uses the control of the present disclosure according to the first embodiment, and a case in which the function of the limiter 26 in FIG. 1 is implemented is illustrated. In FIG. 5, the waveforms are the same as those in FIG. 4, until the speed of the motor 10 becomes in a second speed range that is lower than a first speed, after the motor 10 starts decelerating under a condition in which the controller 20 controls the speed of the motor 10 to be substantially fixed in a first speed range that is higher than or equal to the first speed (forward speed "+A" corresponding to the flow rate Q1). The first speed range is a speed range in which the motor 10 can operate at a substantially fixed (e.g., ±5 rpm) speed. The second speed range is a speed range that is lower than the first speed range and that includes zero speed. When the speed of the motor 10 is changed to the second speed range that is lower than the first speed, the controller 20 causes the motor 10 to decelerate while limiting motor torque (output torque) by the limiter 26. Then, when the speed of the motor 10 deviates from the second speed range (speed range of from a forward speed "+A", corresponding to a flow rate "Q1", to a reverse speed "−B" corresponding to a flow rate "−Q1"), the controller 20 releases the limitation set by the limiter 26. When the pressure P undershoots the target pressure, the controller 20 outputs torque that causes the motor 10 to accelerate, in order to increase the pressure P again. At this time, when the motor 10 rotates in the second speed range that is lower than the first speed, the controller 20 causes the motor 10 to accelerate while limiting motor torque (output torque) by the limiter 26. With this arrangement, a control system is unlikely to be unstable, and thus the possibility of loss of synchronism of the motor 10 can be reduced. Also, during acceleration or deceleration of the motor 10 that rotates in the first speed range that is higher than or equal to the first speed (forward speed "+A" corresponding to the flow rate Q1), the controller 20 may or may not limit the motor torque (output torque) by the limiter 26. In FIG. 5, the controller 20 reduces the output torque, under a condition in which the output torque is likely to be the target pressure stably. In other words, the acceleration torque is reduced.

As described above, according to the motor drive method or the motor drive apparatus 100 of the present disclosure, the motor 10 can operate stably in a low speed range. As the output torque of the motor 10 is reduced, rotational stability of the motor 10 is increased. In the motor drive method or the motor drive apparatus 100 of the present disclosure, the output torque of the motor 10 is less than the maximum output torque Tm, in the second speed range that is less than a first speed (forward speed "+A" corresponding to the flow rate Q1) at which the motor 10 rotates, and during at least one of acceleration or deceleration of the motor 10. The output torque of the motor 10 is less than the maximum output torque Tm, without being maintained (fixed) at the maximum output torque Tm. Therefore, rotational stability of the motor 10 is increased, and the motor 10 can thereby operate stably in a low speed range.

In the motor drive method or the controller 20 of the motor drive apparatus 100 of the present disclosure, when the motor 10 rotates at a substantially fixed speed in the second speed range that is lower than a first speed, the output torque of the motor 10 may be reduced to less than the maximum output torque Tm. With this arrangement, without maintaining (fixing) the output torque of the motor 10 at the maximum output torque Tm, the output torque of the motor 10 is reduced to less than the maximum output torque Tm. Therefore, rotational stability of the motor 10 is increased, and the motor 10 can thereby operate stably in a low speed range.

Further, a technique that causes the motor 10 to stably operate in a low speed range includes a method of superimposing harmonic components on a current or voltage of the motor 10. Such harmonic frequencies are frequencies that do not depend on the rotation of the motor 10. If control systems are switched during superimposing of the harmonic frequencies, responsiveness and stability in the rotation control may be reduced. According to the motor drive method or the motor drive apparatus 100 of the present disclosure, superimposing of the harmonic frequencies is not performed, and thus frequencies that do not depend on the rotation of the motor 10 and are among harmonic components of the current or voltage of the motor 10 are substantially the same in each of the second speed range that is lower than a first speed (forward speed "+A" corresponding to the flow rate Q1); and a first speed range that is higher than or equal to the first speed. With this arrangement, the controller 20 does not switch the control systems between speed ranges, with a harmonic approach, and thus reductions in responsiveness and stability in the rotation control can be suppressed. The "frequencies that do not depend on rotation of the motor 10" include carrier frequencies, power frequencies, resonant frequencies of a circuit, and the like. The "substantially the same" means 10% or less the frequencies that do not depend on the rotation of the motor 10.

In a sensor-less control in which a torque coefficient is not controlled, a synchronization locking operation is used. In the synchronization locking operation, the current flows based on a suitable rotational angular velocity, and the rotational angular velocity is controlled such that loss of synchronism does not occur in a motor. With this arrangement, the current does not necessarily flow at an optimal phase. That is, the torque coefficient varies and is not controlled. The torque coefficient (=torque/current) expresses torque that is output from the motor in accordance with the current flowing into the motor. When the synchronization locking operation is performed at a low speed, control systems need to be switched, and thus stability in the rotation control may be reduced. According to the motor drive method or the motor drive apparatus 100 of the present disclosure, the torque coefficient for the motor 10 is in a controlled state, in a second speed range that is lower than a first speed (speed corresponding to the flow rate Q1). The controller 20 does not perform the synchronization locking operation and thus the torque coefficient for the motor 10 becomes in a controlled state. Because the synchronization locking operation is not performed, the controller 20 can control the motor 10 without switching the control systems. Therefore, reductions in stability in the rotation control, at a low speed, can be suppressed.

The controller 20 controls a reactive current that flows into the motor 10, in the second speed range, so that the torque coefficient for the motor 10 is in a controlled state. The torque output from the motor 10 varies depending on a phase difference of the current that flows into the motor 10, even when the magnitude of the current flowing into the motor 10 is the same. For example, as a rate for the reactive current flowing into the motor 10 increases, the torque output from the motor 10 is reduced, and thus the torque coefficient is reduced. That is, when the controller 20 controls the reactive current flowing into the motor 10, the phase of the current flowing into the motor 10 is in a controlled state, and thus the torque coefficient for the motor 10 becomes in a controlled state.

Further, when the motor 10 performs a transient operation, loss of synchronism of the motor 10 is likely to occur in a range near a zero speed, where in the transient operation, after the motor that rotates forward is rotated reversely upon detecting that a motor speed exceeds zero speed, the motor is again rotated forward. Also, in a ultra-low speed range (in this example, a second speed range) that includes zero speed, efficiency in a device operating in accordance with driving of the motor 10 is decreased rapidly in general. According to the motor drive method or the motor drive apparatus 100 of the present disclosure, when a speed that is lower than a first speed is a second speed, the controller 20 does not cause the motor 10 to operate stably in a second speed range that is lower than the second speed, and the second speed range includes zero speed. With this arrangement, loss of synchronism of the motor 10 is reduced and thus reductions in device efficiency can be suppressed.

In addition, in a second speed range that is lower than a first speed (forward speed "+A" corresponding to the flow rate Q1) at which the motor 10 rotates, and in a loading range in which pressure P detected by the pressure sensor 16 is greater than the predetermined pressure P1, as the motor 10 rotates at a low speed, the controller 20 causes the torque of the motor 10 to be reduced significantly (see FIGS. 2 and 3). In the second speed range that is lower than the first speed (forward speed "+A" corresponding to the flow rate Q1) at which the motor 10 rotates, and in the loading range in which the pressure P detected by the pressure sensor 16 is greater than the predetermined pressure P1, as the pressure P detected by the pressure sensor 16 is increased, the controller 20 causes the torque of the motor 10 to be reduced significantly (see FIGS. 2 and 3). Therefore, in the range expressed by the diagonals illustrated in FIG. 2, rotational stability of the motor 10 is increased, and the motor 10 can thereby operate stably in a low speed range.

According to the motor drive apparatus 100, the motor 10 that drives the pump 11 can operate stably in the low speed range, and thus the pump 11 can operate stably in the low speed range.

Also, according to the motor drive apparatus 100, acceleration of the motor 10 is limited by the limiter 26, and thus output torque of the motor 10 is suppressed. With this arrangement, rotational stability of the motor 10 is increased, and thus the motor 10 can operate stably in the low speed range.

Further, according to the motor drive apparatus 100, when an upper limit for acceleration of the motor 10 is reduced by the limiter 26, the acceleration of the motor 10 is limited, and thus output torque of the motor 10 is suppressed. With this arrangement, rotational stability of the motor 10 is increased, and the motor 10 can operate stably in the low speed range.

In the motor drive apparatus 100, the controller 20 may limit a jerk (jerk) of the motor 10 by the limiter 26. With this arrangement, rotational stability of the motor 10 is increased, and thus the motor 10 can operate stably in the low speed range.

Also, in the motor drive apparatus 100, the controller 20 may limit the jerk of the motor 10 by the limiter 26 that reduces an upper limit for the jerk of the motor 10. With this arrangement, output torque of the motor 10 is suppressed, and thus rotational stability of the motor 10 is increased. Therefore, the motor 10 can operate stably in the low speed range.

In the motor drive apparatus 100, the controller 20 may also suppress the output torque of the motor 10 by generating a speed command to limit the current that flows through the motor 10. As a result, rotational stability of the motor 10 is increased, and thus the motor 10 can operate stably in a low speed range.

In the motor drive apparatus 100, the controller 20 may also suppress the output torque of the motor 10 by generating the speed command $\omega^*$ that causes an upper limit for the current flowing into the motor 10, to be reduced. With this arrangement, rotational stability of the motor 10 is increased, and thus the motor 10 can operate stably in the low speed range.

Figure 6:
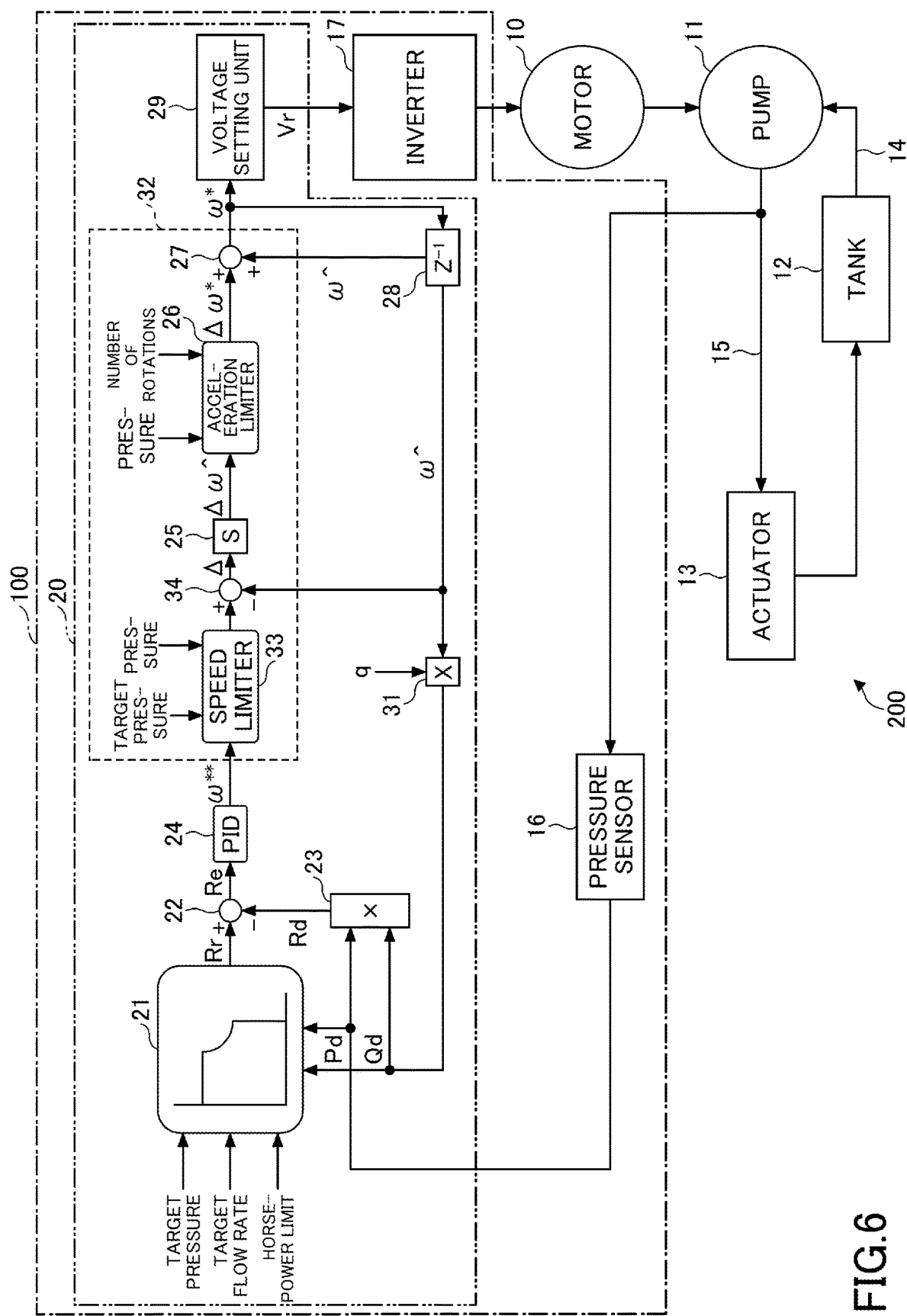
FIG. 6 is a diagram illustrating an example of the configuration of the fluid pressure unit that includes the motor drive apparatus according to a second embodiment.

FIG. 6 is a diagram illustrating an example of the configuration of the fluid pressure unit that includes the motor drive apparatus according to a second embodiment. The description for the same configuration and effect as described in the first embodiment is omitted or simplified with reference to the above-mentioned description. In a motor drive apparatus 101 according to the second embodiment, the configuration of the controller 20 differs from that in the first embodiment. The controller 20 according to the second embodiment includes a speed-command correcting unit 32.

The controller 20 includes the PID controller 24 that determines the original command speed $\omega^{}$ that causes a difference Re to approach zero in PID control. The original command speed $\omega^{}$ may be determined by PI control. The original command speed $\omega^{}$ is an example of an original speed command that causes discharge pressure of the pump 11** to approach target pressure Pr.

The speed-command correcting unit 32 includes a speed limiter 33 that changes the original command speed $\omega^{}$ to the first speed range, when the original command speed $\omega^{}$ generated by the PID controller 24 is in the second speed range. The first speed range is a speed range in which the motor 10 can operate at a speed that is substantially fixed (e.g., ±5 rpm). The second speed range is a speed range that is lower than the first speed range and includes zero speed. The speed-command correcting unit 32 calculates a speed difference $\Delta(=\omega^{}-\omega\hat{})$ by a subtractor 34 that subtracts the previous speed $\omega\hat{}$ from the original speed command $\omega^{}$ output from the speed limiter 33, and then calculates acceleration $\Delta\omega\hat{}$ by a differentiator 25 that differentiates the speed difference $\Delta$. The speed-command correcting unit 32 determines the acceleration $\Delta\omega\hat{}$ (acceleration $\Delta\omega\hat{}$ output from the limiter 26 is referred to as "acceleration $\Delta\omega^{}$") that is limited by the limiter 26** and is set to be less than or equal to an upper limit, and the upper limit is set in accordance with an actual loading condition (for example, a number of rotations ($\approx$flow rate Q) and pressure P).

The speed limiter 33 changes the original command speed $\omega^{}$ to the first speed range, when the original command speed $\omega^{}$ generated by the PID controller 24 is in the second speed range. With this arrangement, the original command speed $\omega^{}$ generated by the PID controller 24 is changed to the first speed range by the speed limiter 33, when the original command speed $\omega^{}$ is in the second speed range. Thus, the speed of the motor 10 can be prevented from being maintained in the second speed range. Therefore, before loss of synchronism, the speed of the motor 10 is rapidly changed from the second speed range to the first speed range. Accordingly, rotational stability of the motor 10 is ensured, and the motor 10 can thereby operate stably.

While in the second speed range, the original command speed ω** generated by the PID controller 24 is changed to the first speed range. With this arrangement, the speed limiter 33 can prohibit the motor 10 from operating at a substantially fixed speed in the second speed range. Thus, the speed of the motor 10 is rapidly changed from the second speed range to the first speed range, before loss of synchronism. Therefore, rotation stability of the motor 10 is ensured, and the motor 10 can operate stably.

For example, the speed limiter 33 changes the original command speed ω to the first speed range, within a time period (for example, 1 second) taken from a timing at which the original command speed ω generated by the PID controller 24 is changed to the second speed range, to a timing at which loss of synchronism of the motor 10 occurs. With this arrangement, the speed of the motor 10 is changed to the first speed range within a 1-second time period following the loss of synchronism of the motor 10. Therefore, rotational stability of the motor 10 is ensured, and the motor 10 can thereby operate stably.

FIG. 7 is a diagram illustrating an example of control waveforms used in the motor drive apparatus that uses the control of the present disclosure according to a second embodiment, and an example of the operation in which the target pressure Pr is reduced is illustrated in a case where the function of the speed limiter 33 illustrated in FIG. 6 is implemented.

The first speed range includes a forward range in which the motor 10 rotates forward, and includes a reverse range in which the motor 10 rotates reversely. The forward range of the first speed range is a range that is higher than or equal to a forward speed "+A." In other words, a minimum speed in the forward range of the first speed range is the forward speed "+A." The reverse range of the first speed range is a range that is higher than or equal to a reverse speed "−B." in other words, a minimum speed in the reverse range of the first speed range is the reverse speed "−B" (magnitude of a given speed in the reverse range is determined based on an absolute value of the given speed). In contrast, the second speed range is a speed range from the forward speed "+A" to reverse speed "−B."

For example, before loss of synchronism, the speed limiter 33 changes the original command speed ω**, which is generated by the PID controller 24, from the second speed range to the forward range or reverse range of the first speed range. With this arrangement, rotation stability of the motor 10 is ensured and thus the motor 10 can operate stably. The change to the reverse range of the first speed range is made. This is because, for example, when the pump 11 is pressurized externally or operates with a vacuum, there are cases where the motor 10 may continue to rotate reversely. In this case, even if the motor 10 rotates reversely for some time periods, the pump is not depressurized.

For example, when a deviation that is obtained by subtracting the target pressure Pr from the discharge pressure (pressure Pd) of the pump 11 is greater than a first threshold, the speed limiter 33 sets a minimum limit speed of the motor 10 to the backward speed "−B" in the second speed range. With this arrangement, when the deviation is increased, the motor 10 is allowed to rotate reversely, and thus actual discharge pressure can rapidly approach the target pressure Pr. In contrast, when the deviation obtained by subtracting the target pressure Pr from the discharge pressure (pressure Pd) of the pump 11 is less than a second threshold, the speed limiter 33 sets the minimum limit speed of the motor 10 to the forward speed "+A." With this arrangement, under a convergence condition in which the actual discharge pressure is relatively close to the target pressure Pr, the motor 10 is prohibited from rotating reversely. The second threshold is less than the first threshold, by influenced by formation of hysteresis, but may be the same as the first threshold.

A behavior illustrated in FIG. 7 will be described below in more detail.

While the speed of the motor 10 is in the forward range, when the deviation, which is obtained by subtracting the target pressure Pr from the discharge pressure (pressure Pd) of the pump 11, exceeds the first threshold, the controller 20 changes the original command speed ω** to the reverse range of the first speed range.

For example, while the speed of the motor 10 is in the forward range, when the deviation, which is obtained by subtracting the target pressure Pr from the discharge pressure (pressure Pd) of the pump 11, exceeds the first threshold at a time point t1, the PID controller 24 reduces the original command speed ω such that the pressure Pd approaches the target pressure Pr. The speed limiter 33 directly outputs the original command speed ω generated by the PID controller 24, when the original command speed ω** is in the forward range of the first speed range.

When the original speed command ω that is generated by the PID controller 24 and is in the forward range of the first speed range is reduced to be in the second speed range, the speed limiter 33 changes the original command speed ω to a variable or fixed speed (for example, the reverse speed "−B") that is in the reverse range of the first speed range. With this arrange, the motor 10 rotates reversely such that the pressure Pd rapidly approaches the target pressure Pr. Even when the speed of the motor 10 is changed to the second speed range, the speed of the motor 10 is changed from the second speed range to the reverse range of the first speed range, before loss of synchronism. Thus, rotation stability of the motor 10 is ensured, and the motor 10 can operate stably. The speed limiter 33 maintains the original command speed ω at a variable or fixed speed (e.g., reverse speed "−B") in the reverse range of the first speed range, when the original speed command ω generated by the PID controller 24 is in the second speed range.

When the original speed command ω generated by the PID controller 24 is changed from the second speed range to the reverse range of the first speed range, the speed limiter 33 directly outputs the original speed command ω generated by the PID controller 24.

While the speed of the motor 10 is in the second speed range or the reverse range of the first speed range, when a given deviation, which is obtained by subtracting the target pressure Pr from the discharge pressure (Pd) of the pump 11, is less than the second threshold at a time point t2, the speed limiter 33 changes the original command speed ω** to a speed (for example, forward speed "+A") in the forward range of the first speed range. With this arrangement, the speed of the motor 10 can be rapidly increased to be in the forward range of the first speed range, so as to be returned to the forward range. Also, the speed of the motor 10 is changed to the forward range of the first speed range, before loss of synchronism. Therefore, rotation stability of the motor 10 is ensured, and the motor 10 can thereby operate stably.

With respect to the above-mentioned embodiments, the following manners are further disclosed.

A motor drive method in one manner of the present disclosure is a method of driving a motor by a motor drive apparatus that includes an inverter that regulates supplied power to the motor that is a synchronous machine and includes a controller that controls the inverter, the method including:

changing, before loss of synchronism, a speed of the motor from a second speed range to a first speed range, wherein a speed range in which the motor is operable at a substantially fixed speed is the first speed range, and a speed range that is lower than the first speed range and includes zero speed is the second speed range.

According to the motor drive method in the one manner, even when a motor operates in a second speed range that is lower than a first speed range, a speed of a motor is changed from the second speed range to the first speed range, before loss of synchronism. Therefore, rotational stability of the motor is secured and thus the motor can operate stably.

The motor drive method may include:

detecting discharge pressure of a pump, wherein the motor is a motor that drives the pump; and changing the speed of the motor to the second speed range, upon occurrence of a condition in which the speed of the motor is in a forward range, in conjunction with occurrence of a condition in which a deviation, which is obtained by subtracting target pressure from the discharge pressure of the pump, is greater than a first threshold, wherein the first speed range includes at least the forward range in which the motor rotates forward.

In this manner, even when a deviation is greater than a first threshold, and thus a speed of a motor is changed to a second speed range, the speed of the motor is changed from the second speed range to a first speed range, before loss of synchronism. Therefore, rotational stability of the motor is secured, and the motor can thereby operate stably.

The motor drive method may include: changing the speed of the motor to the forward range before the loss of the synchronism, upon occurrence of a condition in which the deviation, which is obtained by subtracting the target pressure from the discharge pressure of the pump, is less than a second threshold after the speed of the motor is changed to the second speed range, wherein a threshold that is less than or equal to the first threshold is the second threshold.

In this manner, when a deviation is less than a second threshold after a speed of a motor is changed to a second speed range, the speed of the motor is changed to a forward range, before loss of synchronism. Therefore, rotational stability of the motor is secured, and the motor can thereby operate stably.

The motor drive method may include: prohibiting the motor from operating at a substantially fixed speed, in the second speed range.

In this manner, a speed of a motor is rapidly changed from a second speed range to a first speed range, before loss of synchronism. Therefore, rotational stability of the motor is secured, and the motor can thereby operate stably.

The motor drive method may include: changing the speed of the motor from the second speed range to the first speed range, within a time period that is taken from a timing at which the speed of the motor is changed to the second speed range, to a timing at which loss of synchronism of the motor occurs.

In this manner, after a speed of a motor is changed to a second speed range, the speed of the motor is changed to a first speed range, before loss of synchronism. Therefore, rotational stability of the motor is secured, and the motor can thereby operate stably.

In a motor drive method, the time period may be one second.

In this manner, after a speed of a motor is changed to a second speed range, the speed of the motor is changed to a first speed range within a 1 second period following loss of synchronism. Therefore, rotational stability of the motor is secured, and the motor can thereby operate stably.

The motor drive method may include: generating an original command speed that causes discharge pressure of the pump to approach the target pressure, and changing the original command speed to the first speed range in a case where the original command speed is in the second speed range.

In this manner, even when an original command speed is generated, the original command speed is changed to a first speed range in a case the original command speed is in a second speed range. Thus, maintaining of the speed of the motor in the second speed range can be suppressed. Therefore, the speed of the motor is rapidly changed from the second speed range to the first speed range, before loss of synchronism. Accordingly, rotational stability of the motor is secured, and the motor can thereby operate stably.

The motor drive method may include: generating an original command speed that causes the discharge pressure of the pump to approach the target pressure, and changing the original command speed to a reverse range, upon occurrence of a condition in which a speed of a motor is in a forward range, in conjunction with occurrence of a condition in which a deviation, which is obtained by subtracting the target pressure from the discharge pressure of the pump, is greater than the first threshold, wherein the first speed range includes the forward range and the reverse range in which the motor rotates reversely.

In this manner, while a speed of a motor is in a forward range, when a deviation is greater than a first threshold, an original command speed is changed to a reverse range. Thus, the motor can rotate reversely such that a deviation is rapidly reduced.

The motor drive method may include: generating an original command speed that causes the discharge pressure of the pump to approach the target pressure, and changing the original command speed to the second speed range or a reverse range, upon occurrence of a condition in which the speed of the motor is in the forward range, in conjunction with occurrence of a condition in which the deviation, which is obtained by subtracting target pressure from the discharge pressure of the pump, is less than the second threshold, wherein the first speed range includes the forward range and the reverse range in which the motor rotates reversely.

In this manner, while a speed of a motor is in a second speed range or in a reverse range, when a deviation is less than a second threshold, an original command speed is changed to a forward range. Therefore, the speed of the motor can be rapidly increased to be in the forward range.

The motor drive method may include:

reducing output torque of the motor to be less than maximum output torque while the speed of the motor is in the second speed range, wherein maximum torque that is output from the motor, which the motor drive apparatus is driving, is the maximum output torque.

Maximum output torque is determined based on a device constant for a motor, a control constant for a controller, a current magnitude of the motor, or the like. In general, motors are difficult to stably operate at a substantially fixed speed under a condition in which the motors transmit the maximum output torque, due to factors such as over time, temperature characteristics, individual differences, and the like (e.g., in the position sensorless control, due to occurrence of errors in position estimation that are caused by the factors). When output torque of the motor is reduced, rotational stability of the motor is increased. According to the motor drive method, when a speed of a motor is in a second speed range, output torque of the motor is less than maximum output torque, without maintaining (fixing) the output torque of the motor at the maximum output torque. Therefore, rotational stability of the motor is increased, and the motor can thereby operate in a low speed range.

In a motor drive method or a controller of a motor drive apparatus of the present disclosure, in a speed range that is lower than a first speed at which a motor rotates, and during at least acceleration or deceleration of the motor, output torque of the motor may be reduced to be less than maximum output torque. Also, in the motor drive method or the controller of the motor drive apparatus of the present disclosure, when the motor rotates at a substantially fixed speed in a speed range that is lower than a first speed at which the motor rotates, output torque of the motor may be reduced to be less than the maximum output torque. In this case, the output torque of the motor becomes less than maximum output torque, without being maintained (fixed) at the maximum output torque. Therefore, rotational stability of the motor is increased, and the motor can thereby operate in a low speed range.

In the motor drive method, a frequency that does not depend on rotation of the motor and is among a harmonic component of a current through the motor or a voltage of the motor may be substantially the same in each of the first speed range and the second speed range.

In this manner, a motor can operate more stably.

In the motor drive method, a torque coefficient for the motor may be in a controlled state while the speed of the motor is in the second speed range.

In this manner, a motor can operate more stably.

The motor drive method may include: controlling the motor without using a position sensor that detects a rotational position of the motor.

In this manner, even in a motor control system in which a position sensor is not used, a motor can operate stably.

A motor drive apparatus in one manner of the present disclosure includes:
an inverter configured to regulate supplied power to a motor that is a synchronous machine; and
a controller configured to control the inverter,
wherein when a speed range in which the motor is operable at a substantially fixed speed is a first speed range, and a speed range that is lower than the first speed range and includes zero speed is a second speed range,
the controller is configured to change the speed of the motor from the second speed range to the first speed range, before loss of synchronism.

According to the motor drive apparatus in the one manner, even when a motor operates in a second speed range that is lower than a first speed range, a speed of the motor is changed from the second speed range to the first speed range, before loss of synchronism. Therefore, rotational stability of the motor is secured, and the motor can thereby operate stably.

In the motor drive apparatus, the motor may be controlled without using a position sensor that detects a rotational position of the motor.

In this manner, even in a motor control system in which a position sensor is not used, a motor can operate stably.

Although the embodiments have been described, it would be understood that various modifications to manners and description can be made without departing from the spirit and scope set forth in the claims. Various modifications and changes, such as combinations and substitutions with some or all of the other embodiments, can be made.

For example, the technique of the present disclosure is not limited to application to the position sensorless control, and can also be applicable to a system that controls a motor by using position information that is detected by a position sensor.

The motor is not limited to a motor that drives a pump, and may also be a motor that drives a device (e.g., a compressor) that is different from the pump. When the motor drives the compressor, discharge pressure of the pump can be read as discharge pressure of the compressor in the above-mentioned embodiments.

This application claims priority under Japanese Patent Application No. 2019-180997, filed Sep. 30, 2019, the entire contents of which are hereby incorporated by reference.

DESCRIPTION OF REFERENCE SYMBOLS

10 motor
16 pressure sensor
17 inverter
20 controller
30, 32 speed-command correcting unit
100, 101 motor drive apparatus
200 fluid pressure unit

The invention claimed is:

1. A motor drive method of driving a motor by a motor drive apparatus that includes
an inverter that regulates supplied power to the motor that is a position sensorless synchronous machine, and
a controller that outputs a control signal to control the inverter, the method comprising:
reducing output torque of the motor to be less than maximum output torque of the motor, in a speed range that is lower than a first speed at which the motor rotates,
wherein the maximum output torque is maximum torque that is output from the motor in a case where the motor drive apparatus drives the motor, and
wherein a torque coefficient for the motor is in a controlled state, in the speed range that is lower than the first speed.

2. The motor drive method according to claim 1, wherein a frequency that does not depend on rotation of the motor and is among a harmonic component of a current through the motor or a voltage of the motor is substantially the same in each of the speed range that is lower than the first speed range and a speed range that is higher than or equal to the first speed.

3. The motor drive method according to claim 1, wherein when a speed that is lower than the first speed is a second speed, the motor does not operate steadily in a speed range that is lower than the second speed, the speed range including zero speed.

4. The motor drive method according to claim 1, wherein the motor drive apparatus includes a load detector that detects a load applied to a device or the motor, the device operating in accordance with driving of the motor, and
wherein in the speed range that is lower than the first speed at which the motor rotates, and in a loading range in which the load detected by the load detector is greater than a predetermined magnitude,
as the rotation of the motor is reduced, the output torque is reduced significantly, and
as the load detected by the load detector is increased, the output torque is reduced significantly.

5. The motor drive method according to claim 4, wherein the motor is a motor that drives a pump, and
wherein the load is discharge pressure of the pump or load torque of the motor.

6. The motor drive method according to claim 1, further comprising:
suppressing the output torque by limiting acceleration of the motor.

7. The motor drive method according to claim 6, further comprising:
limiting the acceleration of the motor by reducing an upper limit for the acceleration of the motor.

8. The motor drive method according to claim 1, further comprising:
suppressing the output torque by limiting a jerk of the motor.

9. The motor drive method according to claim 8, further comprising:
limiting the jerk of the motor by reducing an upper limit for the jerk of the motor.

10. The motor drive method according to claim 1, further comprising:
suppressing the output torque by limiting a current through the motor.

11. The motor drive method according to claim 10, further comprising:
suppressing the output torque by reducing an upper limit for the current through the motor.

12. A motor drive apparatus comprising:
an inverter configured to regulate supplied power to a motor that is a position sensorless synchronous machine; and
a controller configured to output a control signal to control the inverter,
wherein when maximum torque that is output from the motor is maximum output torque in a case where the motor drive apparatus drives the motor, the controller is configured to reduce the output torque of the motor to be less than the maximum output torque, in a speed range that is lower than a first speed at which the motor rotates, and
wherein a torque coefficient for the motor is in a controlled state, in the speed range that is lower than the first speed.

13. The motor drive apparatus according to claim 12, wherein a frequency that does not depend on rotation of the motor and is among a harmonic component of a current through the motor or a voltage of the motor is substantially the same in each of the speed range that is lower than the first speed range and a speed range that is higher than or equal to the first speed.

14. The motor drive apparatus according to claim 12, wherein when a speed that is lower than the first speed is a second speed, the motor does not operate steadily in a speed range that is lower than the second speed, the speed range including zero speed.

15. The motor drive apparatus according to claim 12, wherein the motor drive apparatus includes a load detector configured to detect a load applied to a device or the motor, the device operating in accordance with driving of the motor, and
wherein, in the speed range that is lower than the first speed at which the motor rotates, and in a loading range in which the load detected by the load detector is greater than a predetermined magnitude, the controller is configured to
reduce the output torque significantly as the rotation of the motor is reduced, and
reduce the output torque significantly as the load detected by the load detector is increased.

16. The motor drive apparatus according to claim 12, wherein the controller is configured to suppress the output torque by limiting acceleration of the motor.

17. The motor drive apparatus according to claim 12, wherein the controller is configured to suppress the output torque by limiting a jerk of the motor.

18. The motor drive apparatus according to claim 12, wherein the controller is configured to suppress the output torque by limiting a current through the motor.

* * * * *